US007581297B2

(12) United States Patent
Sato et al.

(10) Patent No.: US 7,581,297 B2
(45) Date of Patent: Sep. 1, 2009

(54) METHOD OF FABRICATING PIEZOELECTRIC VIBRATOR AND ELECTRONIC APPARATUS AND RADIO WAVE TIMEPIECE HAVING PIEZOELECTRIC VIBRATOR

(75) Inventors: Masayuki Sato, Chiba (JP); Seigo Fukuchi, Chiba (JP); Atsushi Tomisaki, Chiba (JP)

(73) Assignee: Seiko Instruments Inc. (JP)

( * ) Notice: Subject to any disclaimer, the term of this patent is extended or adjusted under 35 U.S.C. 154(b) by 282 days.

(21) Appl. No.: 11/409,653

(22) Filed: Apr. 24, 2006

(65) Prior Publication Data

US 2006/0238076 A1 Oct. 26, 2006

(30) Foreign Application Priority Data

Apr. 25, 2005 (JP) ............................ 2005-126706
Apr. 18, 2006 (JP) ............................ 2006-114222

(51) Int. Cl.
*H01G 7/00* (2006.01)

(52) U.S. Cl. ....................... 29/25.42; 29/25.35; 29/831; 29/832; 29/837; 29/846; 310/370

(58) Field of Classification Search ................ 29/25.35, 29/25.42, 832, 831, 837, 857, 846; 228/180.21, 228/180.5, 218, 119; 310/348, 370, 371, 310/311, 323.06; 219/121.54, 121.45, 121.36, 219/121.34
See application file for complete search history.

(56) References Cited

U.S. PATENT DOCUMENTS

| | | | | |
|---|---|---|---|---|
| 6,350,960 | B1 * | 2/2002 | Norris | 219/121.54 |
| 6,521,857 | B1 * | 2/2003 | Barnett | 219/121.46 |
| 6,555,778 | B1 * | 4/2003 | Barnett | 219/121.45 |

OTHER PUBLICATIONS

Patent Abstracts of Japan, publication No. 09-312545, publication date Dec. 2, 1997.

* cited by examiner

*Primary Examiner*—Derris H Banks
*Assistant Examiner*—Tai Nguyen
(74) *Attorney, Agent, or Firm*—Adams & Wilks

(57) ABSTRACT

A piezoelectric vibrator has an airtight terminal comprised of a lead terminal and a piezoelectric member. The lead terminal has an inner lead portion and an outer lead portion. The piezoelectric member has an exciting electrode and a mount electrode disposed on a surface of the piezoelectric member. A plasma arc electrode is connected to a power supply for generating a plasma arc discharge. To bond together the inner lead portion of the lead terminal to the mount electrode of the piezoelectric member, the outer lead portion is connected to an output terminal of the power supply and the plasma arc electrode is positioned at a vicinity of a bonding portion for bonding together the inner lead portion and the mount electrode. A voltage is applied between the inner lead portion and the plasma arc electrode to generate a plasma arc discharge. The generated plasma arc is discharged to the bonding portion while subjecting at least the bonding portion to an argon gas atmosphere to thereby bond together with a solder the inner lead portion and the mount electrode.

6 Claims, 10 Drawing Sheets

METHOD OF FABRICATING PIEZOELECTRIC VIBRATOR AND ELECTRONIC APPARATUS AND RADIO WAVE TIMEPIECE HAVING PIEZOELECTRIC VIBRATOR

BACKGROUND OF THE INVENTION

1. Field of the Invention

The present invention relates to a piezoelectric vibrator bonded with a piezoelectric vibrating piece at a lead terminal and its fabricating method, a piezoelectric oscillator, an electronic apparatus, and a radio wave timepiece.

2. Description of the Related Art

A piezoelectric vibrator is an electronic element indispensable for fabricating industrial products such as a timepiece, an oscillator, an electronic apparatus or the like, and is used as a time source, a timing source, or a reference source of a signal. As a package of a piezoelectric vibrator, a cylinder type package in a cylindrical shape is commonly used. A constitution of a piezoelectric vibrator of the cylinder type package will be explained in reference to the drawings.

FIG. 13 is a disassembled perspective view showing an inner structure of a piezoelectric vibrator of a cylinder type package, and FIG. 14 is a fabrication flowchart schematically showing the fabricating of the piezoelectric vibrator.

As shown by FIG. 13, a piezoelectric vibrator 6 of a cylinder type package is constituted by a structure in which a piezoelectric vibrating piece 4 is bonded to an inner lead 2 on an inner side of a stem 8 constituting a metal ring of an airtight terminal 1 including two pieces of metallic lead terminals. The piezoelectric vibrating piece 4 comprises a piezoelectric material of quartz or the like and is formed in a shape of a tuning fork by a photolithography technology. Exciting electrodes 4*a* are formed at surfaces of two pieces of vibrating arm portions of the piezoelectric vibrating piece 4 of the tuning fork type. A base end side of the piezoelectric vibrating piece 4 is formed with a mount electrode 7 communicating with the exciting electrode 4*a*.

The piezoelectric vibrating piece 4 and the inner lead 2 are bonded by the mount electrode 7. The inner lead 2 is penetrated through hermetic glass at inside of a stem 8, and a portion thereof mounted on a board is referred to as an outer lead (designated by notation 3). The inner lead 2 and the outer lead 3 are generally referred to as lead terminal. An outer periphery of the stem 8 is covered with a sealing tube of a bottomed cylinder member in a cylindrical shape made of a metal, not illustrated, to cover the piezoelectric vibrating piece 4 of the tuning fork type to be subjected to airtight sealing in vacuum.

According to the piezoelectric vibrator of the cylinder type package constituted as described above, when a predetermined voltage is applied to the two pieces of the outer leads 3 as a drive voltage, a current flows from the inner lead 2 to the exciting electrode 4*a* by way of the mount electrode 7, and the piezoelectric vibrating piece 4 is oscillated by a predetermined frequency.

As shown by FIG. 14, steps of fabricating the piezoelectric vibrator 6 include a step of bonding the inner lead 2 and the piezoelectric vibrating piece 4, a frequency trimming step of achieving a predetermined frequency from the piezoelectric vibrating piece 4, and a sealing step of sealing the sealing tube of the bottomed cylinder member of a metal to the stem 8 of the airtight terminal 1, and among the steps, a heating step and a step in vacuum are included. In the respective fabricating steps, a carrying pallet is utilized as means for positioning the piezoelectric vibrator 6, and the piezoelectric vibrator 6 is fabricated.

FIG. 15 is an outline perspective view showing a carrying pallet for the piezoelectric vibrator of the background art and the piezoelectric vibrator positioned in the carrying pallet. In the respective fabricating steps, according to the airtight terminal 1 including the lead terminal, as shown by an enlarged view on a right upper side of FIG. 15, one end of the outer lead 3 is fixed by a fixing spring 19 bonded to a carrying pallet 18 of the piezoelectric vibrator 6. The carrying pallet 18 of the piezoelectric vibrator 6 fixing the outer lead 3 is positioned to a fabricating apparatus in the heating step, the step in vacuum and the like to carry out a bonding operation, a frequency trimming operation, a sealing operation or the like. In the step of bonding the inner lead 2 and the piezoelectric vibrating piece 4, the piezoelectric vibrating piece 4 is aligned to an aligning jig (not illustrated) constituting aligning means and the carrying pallet 18 fixing the outer lead 3 is positioned to the aligning jig. Thereby, the inner lead 2 and the piezoelectric vibrating piece 4 on the carrying pallet 18 are positioned.

There is known a method of bonding the inner lead 2 and the piezoelectric vibrating piece 4 by applying hot wind of nitrogen or the like and pertinently heated from above an end portion of the piezoelectric vibrating piece 4 and the inner lead 2 positioned to each other. In order to promote a wettability of solder, there is also known a method of adding excitation active species of a discharge gas to the hot wind such as nitrogen gas.

According to these methods, a previously plated solder of the inner lead 2 is melted by the hot wind, and the inner lead 2 and the piezoelectric vibrating piece 4 are bonded. Further, as the plating with the solder, there is commonly used a method of forming several hundreds thousands pieces of airtight terminals by an electrolytic barrel plating method, at a step of fabricating the airtight terminal and the solder is formed with a thickness of about 10 through 15 μm at a surface of the lead terminal and an outer peripheral portion of the stem.

In soldering, a flux is frequently used with an object of promoting a wettability of the solder by removing an oxide film formed naturally in air on a surface of a base material. However, in the case of the piezoelectric member, there is a case in which an electrode on a surface of the piezoelectric member is corroded by residue or splash of the flux to deteriorate a performance thereof and therefore, a nonflux method which does not use a flux has been adopted.

Accordingly, the oxide film or the contamination cannot completely be removed from the surface of the base material and therefore, depending on the state of the surface, the wettability of the solder is significantly varied, and there is a case of bringing about a failure in soldering. The acceptability of the performance of bonding the inner lead 2 and the piezoelectric vibrating piece 4 effects a significant influence on various properties, an accuracy in a frequency and reliability of the piezoelectric vibrator 6.

In order to avoid the failure in soldering owing to low wettability of the solder, there are methods grossly classified into two: a method of a countermeasure of elevating a heating temperature or the like and a method of mixing the excitation active species to the hot wind. A description will be given of respective problems with regard to the two countermeasure methods.

(Problem in a Case of Elevating a Heating Temperature)

According to a heating method by the hot wind of nitrogen or the like, when the piezoelectric vibrating piece comprises quartz, the hot wind is blown to quartz, and a temperature of the vibrating piece per se is excessively elevated. In this case, there is a concern that a strain of twining or the like is generated in a crystal of quartz, properties such as a crystal impedance value, a temperature coefficient and the like are considerably deteriorated. Particularly, at current time in which downsizing of the piezoelectric vibrating piece and the airtight terminal is rapidly progressed, caution is required for a heat capacity of a member to be combined so as not to a deteriorate the members in the midst of the step.

Describing in details, first, the heated hot wind is applied from above the end portion of the piezoelectric vibrating piece 4 and the inner lead 2, the solder of the inner lead 2 is melted to be bonded therewith, however, there is a case in which the heat capacity necessary for melting the solder is not satisfied and excellent bonding by melting the solder is not achieved.

That is, according to the method of heating the hot wind, the heat capacity received by the heated portion is proportional to a wind amount of the hot wind and an area of the heated portion and therefore, a temperature is elevated from a position having a large area of the heated portion. A diameter of the inner lead 2 plated with the solder is small and the heated area is small and therefore, a temperature rise thereof is small.

A large amount of the hot wind is needed in order to provide the heat capacity of the hot wind necessary for melting the solder of the inner lead 2. It is necessary to make the hot wind easy to pass through a surrounding of the heated portion therefor. However, when the hot wind is blocked by a portion of a jig, portion other than the bonding portion is also heated to be melted. As a result, an adverse influence is effected on the vibrating piece as described above. In mounting with a solder having a high melting point such as a heat resistant solder plating, a problem is particular posed thereby. Depending on a shape of the surrounding through which the hot wind passes, an inverse case may be also brought about in which the wind amount of the hot wind is restricted, the heat capacity necessary for melting the solder of the inner lead 2 is not obtained and thus unmelted bonding is present.

Furthermore, in the bonding step, in order to bond a plurality of the airtight terminals successively, a plurality of the airtight terminals and the vibrating pieces are positioned each other beforehand on the carrying pallet 18. The carrying pallet 18 is moved in the direction of long side of the pallet with a constant speed under the nozzle of the hot wind. Thereby, A plurality of the inner lead 2 and the piezoelectric vibrators piece 4 on the carrying pallet are bonded one after another. However, the method of blowing the hot wind to a moving object is liable to undergo a difference in the wind amount owing to a slight deviation in a nozzle angle, fluctuation of the atmosphere and there is a case in which excellent bonding by melting the solder is not achieved owing to an instability in a provided heat amount.

In this way, the heating method by the hot wind poses a problem in view of control of a supplied heat amount and the object to be supplied therewith.

(A Problem of a Method of Utilizing an Excitation Active Species)

In a related art, there is known a method of executing a mounting step by mixing an excitation active species to hot wind. For example, in order to generate an excitation active species, $CF_4$ is selected as a discharge gas, and the excitation active species of fluorine generated in a discharge tube is mixed with a heated hot wind of nitrogen and is injected to a corresponding portion to be mounted. Thereby, a thin fluoride layer is formed on a solder plated layer of a surface of an inner lead and an electrode face to be mounted thereon, at the same time, the solder plated layer is melted and bonding excellent in a wettability can be realized.

However, $CF_4$ gas selected as the discharge gas is a gas showing a green house effect and a gas which is preferably avoided to be used in a fabricating step. Further, a mounting step is a step of frequently repeating supply and take out of a pallet aligned with the piezoelectric vibrating piece 4 and the airtight terminal 1, and it is preferable that an apparatus per se is an apparatus opened to the atmosphere. In this respect, use of the excitation active species of $CF_4$ gas causes to contaminate surrounding air, which is not preferable. Furthermore, since as described above, the hot wind is used on a basis thereof, a controllability is inferior in supplying necessary amounts of the hot wind and the excitation active species only to necessary portions of the piezoelectric vibrating piece 4 and the airtight terminal 1 which are downsized. Further, in operating the apparatus for a long period of time, the excitation active species is supplied also to the apparatus and jigs of the surrounding and therefore, it is necessary to stop the apparatus frequently to disassemble and clean the jigs to poses a problem in view of efficient production.

Next, a description will be given of other problem in the mounting step. A mechanical positioning accuracy of the inner lead 2 and the piezoelectric vibrating piece 4 effects a significant influence on various properties and the accuracy in the frequency and the reliability of the piezoelectric vibrator 6 in addition to the bonding performance and is ranked to be the most important for the performance of the piezoelectric vibrator 6.

Positioning of the inner lead 2 and the piezoelectric vibrating piece 4 is carried out by positioning the carrying pallet 18 to the aligning jig of the piezoelectric vibrating piece 4. However, the one end of the outer lead 3 is fixed by the fixing spring 19 mounted to the carrying pallet 18 and therefore, there is a case in which a positional accuracy necessary for positioning the inner lead 2 and the piezoelectric vibrating piece 4 is not achieved. It just so happens that a tip of vibrating arms of vibrating piece 4 touch an inner wall of the sealing tube 5. The oscillation becomes unstable by the touch. And the touch produces fine particles such as quartz or a conductive material peeled off from the inner wall of the sealing tube 5. When these particles stick to vibration piece 4, a slight frequency shift occurs and oscillation becomes unstable.

SUMMARY OF THE INVENTION

It is an object of the invention to provide a piezoelectric vibrator and its fabricating method resolving the above-described problem, establishing a bonding method excellent in positioning with high accuracy necessary for an electrode on a surface of a piezoelectric member and an inner lead and a controllability, considerably promoting mechanical and electrical reliability of a connecting portion and ensuring an accuracy in a frequency and various properties of a piezoelectric vibrator and a reliability thereof.

In order to achieve the above-described object, the invention adopts the following resolving means.

According to a first aspect of the invention, there is provided a method of fabricating a piezoelectric vibrator which includes an airtight terminal having a lead terminal and a piezoelectric vibrating piece comprising a piezoelectric member and formed with an exciting electrode and a mount electrode at a surface thereof and in which an inner lead of the lead terminal and the mount electrode are bonded, wherein when the inner lead and the mount electrode are bonded, a plasma arc is discharged to a portion of bonding the inner lead and the mount electrode in an argon gas to bond the inner lead and the mount electrode by a solder.

According to a method of fabricating the piezoelectric vibrator of the first aspect of the invention, the invention is constituted by a method of locally supplying a heat amount necessary for melting the plating provided by discharging the plasma arc in a short period of time, which is basically different from the method of the related art in which the wettability is promoted by reforming the surface by heating by the hot wind or adding the excitation active species. Supply of the heat amount by the plasma arc discharge is constituted by a method capable of supplying the heat amount sufficient for melting the solder layer to flow and wet the connecting face with excellent controllability even when the surface of the plating is oxidized to form an oxide film. Further, by placing the bonding portion in an argon atmosphere, the connected surface is prevented from being oxidized by being shut off from oxygen in the atmosphere to realize excellent bonding.

Further, although according to the hot wind system, it is difficult to locally limit an object to be blown by the wind (object to be applied with the heat amount), according to the plasma arc discharge, owing to a property thereof of being generated only at a front end of the electrode most proximate thereto, it is not necessary to mask the piezoelectric member electrode other than the bonding portion, the solder is melted by heat of the plasma arc discharge generated only at the bonding portion of the lead without effecting an influence on the piezoelectric electrode portion other than the bonding portion and only the bonding portion can excellently be connected always. Further, only the piezoelectric member and the lead portion are required to be arranged in the argon gas atmosphere and a special equipment or apparatus of a large-scaled vacuuming apparatus or the like is not needed. There is not posed the problem of contamination of the surrounding which poses the problem in utilizing the excitation active species, it is not necessary to disintegrate and clean jigs frequently and a reduction in the production efficiency can be restrained.

Particularly, utilization of the plasma arc discharge according to the invention is a method which is useful even for a material having a liquid phase line temperature exceeding 400° C. and has been difficult by the method of the related art in bonding by plating a heat resistant solder having a high melting point or using lead free plating introduction of which is investigated in accordance with lead free formation.

According to a second aspect of the invention, there is provided the method of fabricating a piezoelectric vibrator, the method carrying out a connecting step by using a plasma arc discharge by connecting an outer lead portion of the lead terminal to an output terminal of a power supply for the plasma arc and applying a voltage between the inner lead and a plasma arc electrode arranged at a vicinity of the portion of bonding the inner lead and the mount electrode in the first aspect of the invention.

According to the method of fabricating a piezoelectric vibrator of the second aspect of the invention, in the small-sized airtight terminal, it can freely be selected which of one set of the inner leads arranged in parallel to be proximate to each other constitutes an object for generating the plasma arc discharge. Therefore, even when small-sized formation of the airtight terminal is further progressed and a distance between the leads is further shortened, the lead constituting the object of the plasma arc discharge can firmly be identified. Furthermore, it is not necessary to mask the mount electrode other than the bonding portion. Thereby, only the lead in which the outer lead is connected to the power source for the plasma arc can be selected and the connection can be carried out always excellently by the plasma arc discharge heat generated only at the bonding portion of the inner lead. Furthermore, the mount electrode and the inner lead are disposed in the argon gas atmosphere, the surface of the melted solder can be prevented from being oxidized by being shut off from oxygen in the atmosphere, and the piezoelectric vibrator excellently bonding the faces of the both members necessary for being connected by the solder can be fabricated without deteriorating the wettability of the solder with the connecting faces. Further, by the excellent bonding, the piezoelectric vibrator ensuring stability and reliability of various properties and accuracy of the frequency of the piezoelectric vibrator can be fabricated.

According to a third aspect of the invention, there is provided the method of fabricating a piezoelectric vibrator, wherein in bonding the inner lead and the mount electrode, the outer lead of the lead terminal is pinched by positioning means formed with a cut portion, and the inner lead is positioned to the mount electrode of the piezoelectric vibrating piece aligned by aligning means, in the first or second aspect of invention.

According to the method of fabricating the piezoelectric vibrator of the third aspect of the invention, by pinching the outer lead by the positioning means formed with the cut portion, the airtight terminal is constrained and held so as not to be able to be moved from a carrying pallet. By aligning an interval of the cut portions to be larger than a width of the piezoelectric vibrator by pairing at least two portions of the rectangular thin plate, a difference in a rotational angle of the outer lead can be restrained to be small and a positional accuracy necessary for positioning the held inner lead can be satisfied.

That is, whereas a radius of the position of the outer lead is small, the outer lead is plastically deformed by a small load and the position is difficult to be restricted by a direct external force, restriction is performed in the cut portions larger than the width of the piezoelectric vibrator, a rotational angle of the outer lead relative to the outer shape of the piezoelectric vibrator can be restricted by the position having the wide width, and the positional accuracy necessary for the inner lead can be satisfied. The positional accuracy of the cut portion of the rectangular thin plate to be inserted with the outer lead can easily be formed by a general purpose precision working machine achieving a working accuracy of several micrometers of, for example, a dicer or the like, the positional accuracy necessary for positioning utilizing the cut portion can be satisfied, and the piezoelectric vibrator promoting the rotational angle and the positional accuracy can be fabricated.

Further, the rectangular thin plate can easily position the inner leads summarizingly in one motion and is suitable for dealing with stable automation. Further, by providing the bonding face which is correctly positioned and improved, the piezoelectric vibrator ensuring stability and reliability of various properties and the accuracy of the frequency of the piezoelectric vibrator can be fabricated.

According to a fourth aspect of the invention, there is provided the method of fabricating a piezoelectric vibrator, wherein in bonding the inner lead and the mount electrode, the inner lead and the mount electrode are bonded while pressing the inner lead to the mount electrode by utilizing an elastic force of the outer lead of the lead terminal in any of the first aspect through the third aspect of the invention.

According to the method of fabricating the piezoelectric vibrator of the fourth aspect of the invention, by pressing the inner lead to the piezoelectric vibrating piece by the elastic force of the outer lead by bending the outer lead, the inner lead is not bent, the inner stress is alleviated, and the front end portion of the piezoelectric vibrating piece is arranged in a direction of the center of the sealing tube of the cylindrical bottomed cylinder member made of a metal. By arranging the front end portion of the piezoelectric vibrating piece in the direction of the center of the sealing tube, the piezoelectric vibrator for preventing the front end portion of the piezoelectric vibrating piece from being brought into contact with the inner wall of the sealing tube can be fabricated.

According to a fifth aspect of the invention, there is provided a piezoelectric vibrator fabricated by the method of fabricating a piezoelectric vibrator in any one of the first aspect through the fourth aspect of the invention.

According to the fifth aspect of the invention, there is provided the piezoelectric vibrator including the airtight terminal having the lead terminal and the piezoelectric vibrating piece comprising the piezoelectric member and formed with the exciting electrode and the mount electrode at the surface in which the inner lead of the lead terminal and the mount electrode are bonded, and the bonding is carried out with high mechanical positioning accuracy and by the plasma arc discharge and therefore, the sufficiently solid bonding can be realized. Therefore, the piezoelectric vibrator is excellent in a resistance against vibration of an external force of drop impact or the like and therefore, a change in the frequency and an instability of oscillation are significantly restrained and therefore, the high accuracy can be maintained over a long period time.

According to a sixth aspect of the invention, there is provided a piezoelectric oscillator, wherein the piezoelectric vibrator is connected to, an integrated circuit as an oscillation piece.

According to a seventh aspect of the invention, there is provided an electronic apparatus, wherein the piezoelectric vibrator is used by being connected to a counting portion.

According to an eighth aspect of the invention, there is provided a radio wave timepiece, wherein the piezoelectric vibrator is used by being connected to a filter portion.

According to the sixth aspect through the eighth aspect of the invention, the positional accuracy of the mount portion of the included piezoelectric vibrator is high as described above, and the piezoelectric vibrating piece and the inner lead are solidly connected and therefore, the piezoelectric vibrator is excellent in the resistance against vibration or external force of drop impact or the like. Therefore, a change in the frequency and the instability of oscillation can significantly be restrained. Therefore, the apparatus or the like can be maintained with high accuracy over a long period of time.

As described above, according to the invention, there is provided the bonding method excellent in positioning with the high accuracy necessary for the electrode at the surface of the piezoelectric member and the inner lead, supply of the heat amount necessary for bonding and control of the object of supply. Therefore, there can be provided the piezoelectric vibrator promoting mechanical and electrical reliability of the connected portion and ensuring the accuracy of the frequency and various properties of the piezoelectric vibrator and reliability and its fabricating method.

BRIEF DESCRIPTION OF THE DRAWINGS

FIG. 7A is a total outline constitution view, and FIG. 7B is an outline perspective view showing a bonding portion;

FIG. 8A is a photograph showing an example of a bonding state by a method of discharging plasma arc in argon gas, and FIG. 8B is a photograph showing an example of a bonding state by a hot wind system using nitrogen gas;

DESCRIPTION OF THE PREFERRED EMBODIMENTS

The embodiments of the invention will be explained in reference to the drawings as follows.

Embodiment 1

Figure 1:
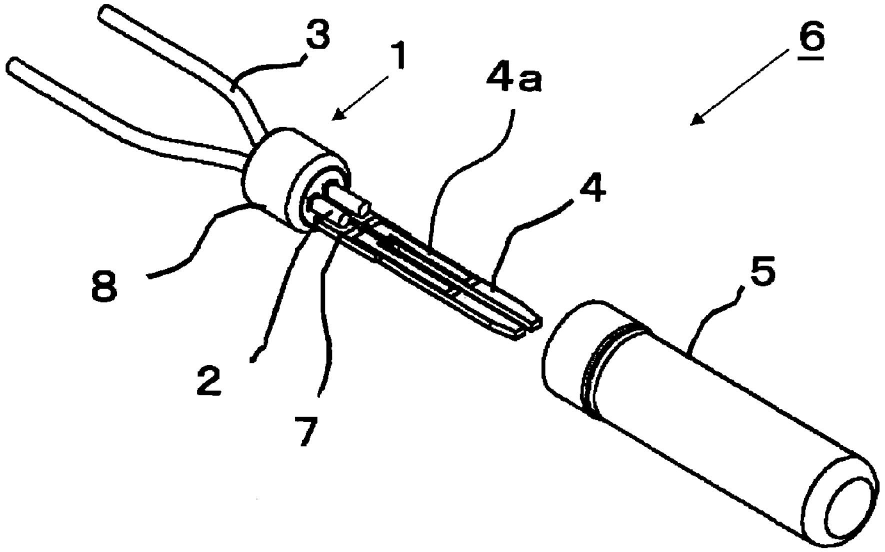
FIG. 1 is an outline perspective view showing a piezoelectric vibrator of an embodiment.

FIG. 1 is an outline disassembled perspective view showing a constitution of a piezoelectric vibrator according to the first embodiment.

As shown by FIG. 1, a piezoelectric vibrator 6 is constituted by an airtight terminal 1 and a piezoelectric vibrating piece 4 comprising a piezoelectric material of quartz or the like, and a sealing tube 5 of a cylindrical bottomed cylinder member made of a metal. Further, the airtight terminal 1 includes a stem 8 in a ring-like shape comprising a metal material and two pieces of lead terminals penetrated through the stem 8. Shorter sides of the two pieces of lead terminals bonded to the piezoelectric vibrating piece 4 and contained in the sealing tube 5 are constituted as inner leads 2, and longer sides thereof projected to outside are constituted as outer leads 3. A surface of the lead terminal and an outer periphery of the stem 8 are subjected to plating.

The piezoelectric vibrating piece 4 of the embodiment is a tuning fork type vibrating piece having a base portion and a pair of vibrating arms protruded from the base portion. A surface of the base portion of the piezoelectric vibrating piece 4 is formed with a pair of mount electrodes 7. Further, respective surfaces of the pair of vibrating arms of the piezoelectric vibrating piece 4 are formed with exciting electrodes 4*a* connected to the mount electrodes 7. By forming the electrodes in this way, when a predetermined drive voltage is applied to the outer leads 3 of the airtight terminal 1, currents flow at the exciting electrodes 4*a* by way of the inner leads 2 and the mount electrodes 7, and the vibrating arms of the piezoelectric vibrating piece 4 are bent to be vibrated at a predetermined frequency.

Here, a simple description will be given of an example of dimensions and the example of a material of the airtight terminal 1. According to a small-sized piezoelectric vibrator used in a small-sized apparatus such as a portable apparatus, a diameter of the stem 8 of the airtight terminal 1 an outer periphery of which has been plated is about 0.95 mm. Further, a diameter of a base material of the lead terminal is about 0.15 mm and a diameter thereof after plating is about 0.18 mm. Normally, a plated layer having a thickness of about 10 μm through 15 μm is formed thereon. As a material of the base material of the lead terminal, kovar (FeNiCo alloy) is commonly used, and as a material of plating, heat resistant solder plating (an alloy of tin and lead, a weight ratio thereof is 1:9), a tin copper alloy (SnCu), a tin gold alloy (AnSn) or the like is used. Further, plating provided to the outer periphery of the stem 8 is of a material the same as that of plating provided to the lead terminal. There is constituted a structure in which an inner portion of the sealing tube 5 is subjected to airtight sealing in a vacuum state by subjecting the outer periphery of the stem 8 to cold pressure welding with an inner periphery of the sealing tube 5 in vacuum by interposing a plated layer thereof.

As an example of dimensions of the small-sized piezoelectric vibrating piece 4 boned to the airtight terminal 1, a width thereof is about 0.5 mm through 0.6 mm, and a total length thereof is about 2.0 mm through 3.2 mm. The mount electrode 7 of the piezoelectric vibrating piece 4 is constituted by a two-layer structure film of chromium (Cr) and gold (Au), after forming a chromium layer having an excellent performance of adhering to quartz as a matrix, a thin layer of gold is provided to a surface thereof. Further, as other structure of the mount electrode 7, a surface of a three-layer structure film of chromium and nichrome (NiCr) may further be deposited with a thin layer of gold. Also in this case, the matrix is constituted by chromium.

Figure 2:
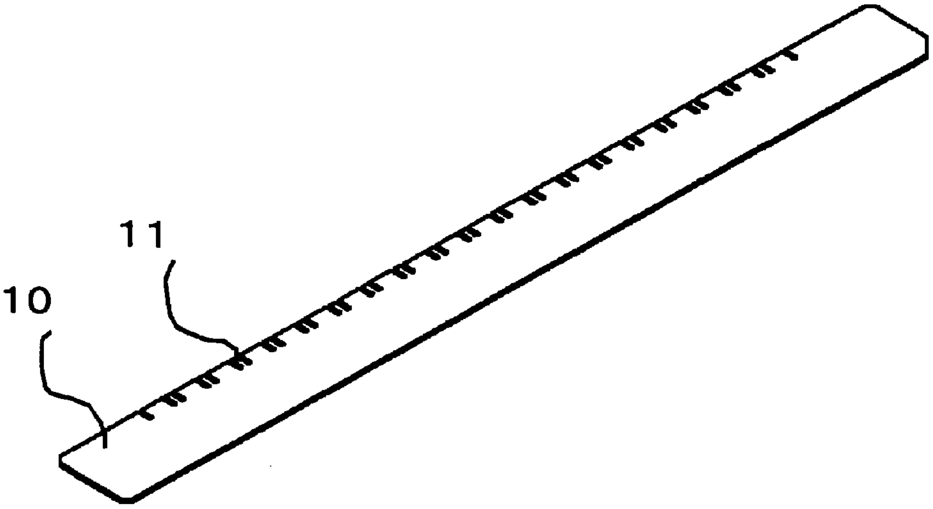
FIG. 2 is an outline perspective view for explaining a pallet for carrying the piezoelectric vibrator of the embodiment.
Figure 3:
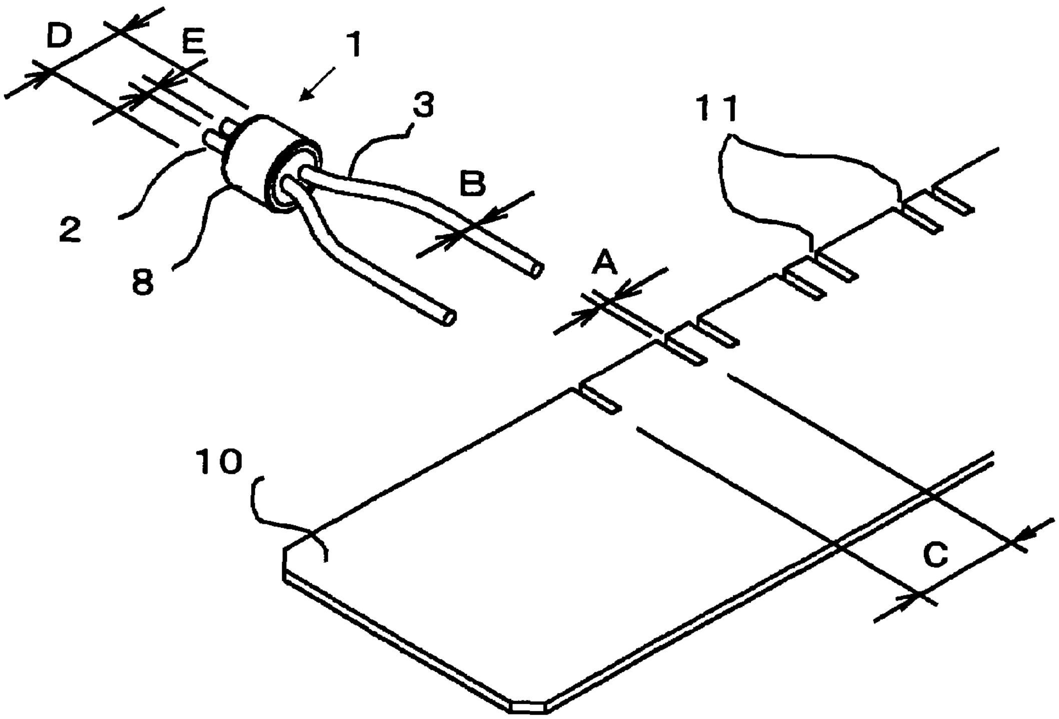
FIG. 3 is an outline perspective view for explaining in details the pallet for carrying the piezoelectric oscillator of FIG. 2.
Figure 4:
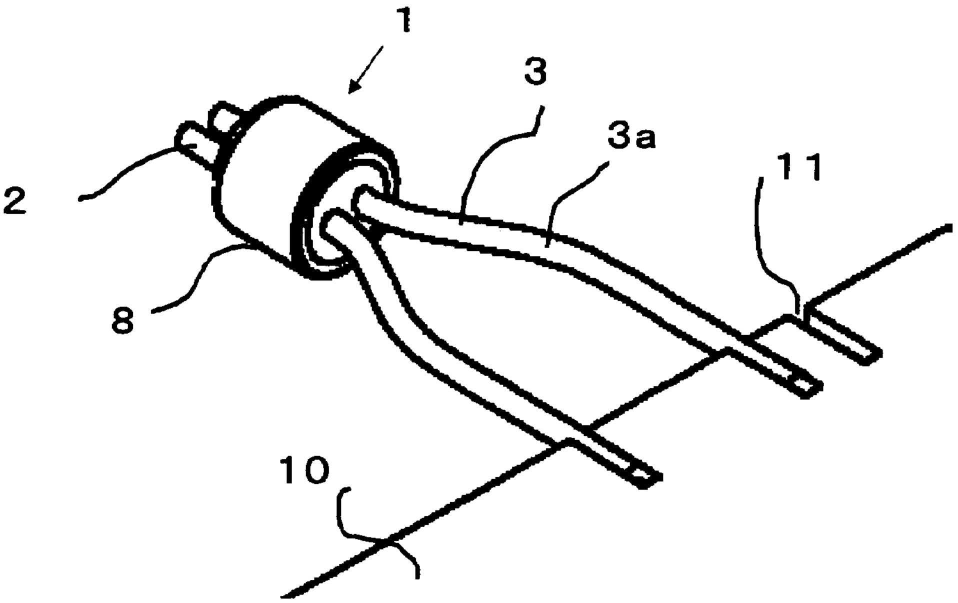
FIG. 4 is an outline enlarged perspective view of an airtight terminal held by a rectangular thin plate of the carrying pallet of the embodiment.
Figure 5:
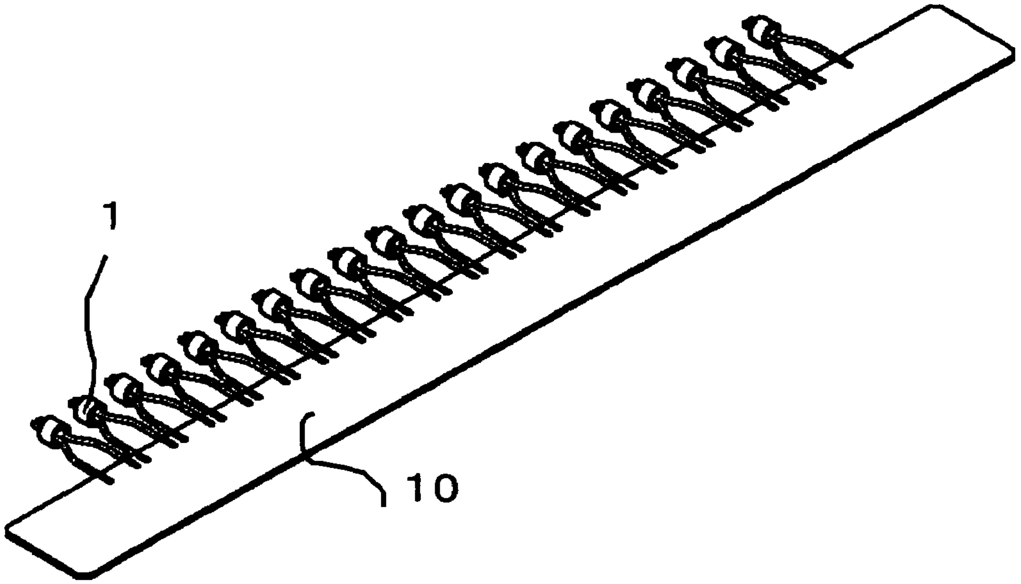
FIG. 5 is an outline total perspective view of the airtight terminal held by the carrying pallet of the embodiment.
Figure 6:
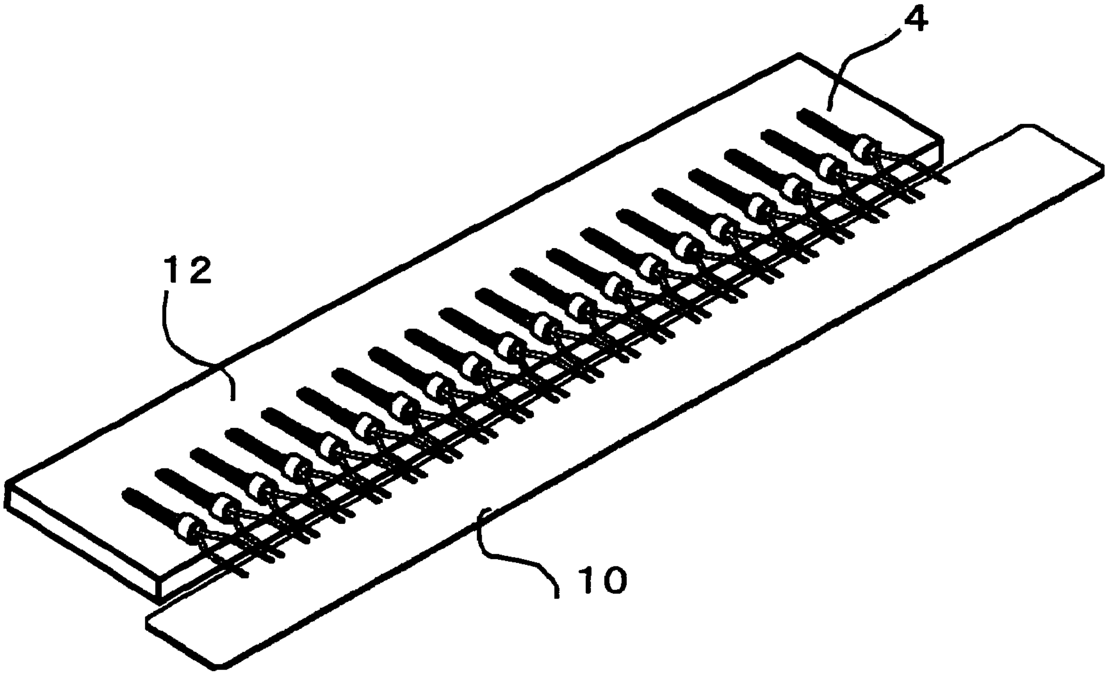
FIG. 6 is an outline perspective view for explaining positioning of the carrying pallet of the embodiment and a piezoelectric vibrating piece aligning jig.
Figure 7A:
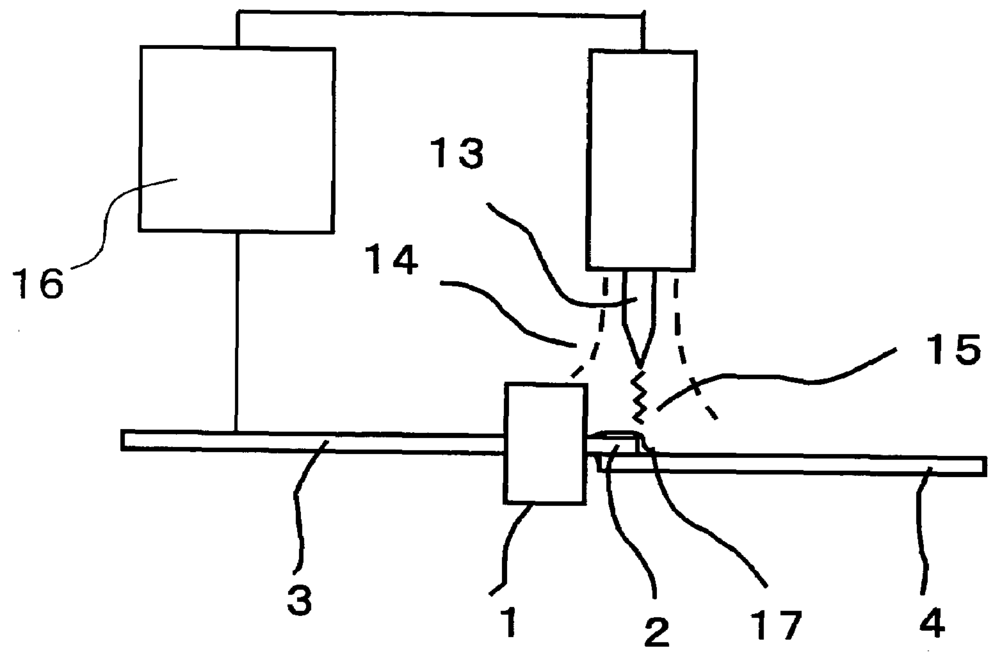
FIGS. 7A and 7B are explanatory views of bonding a lead of the airtight terminal and the piezoelectric vibrating piece by plasma arc.
Figure 7B:
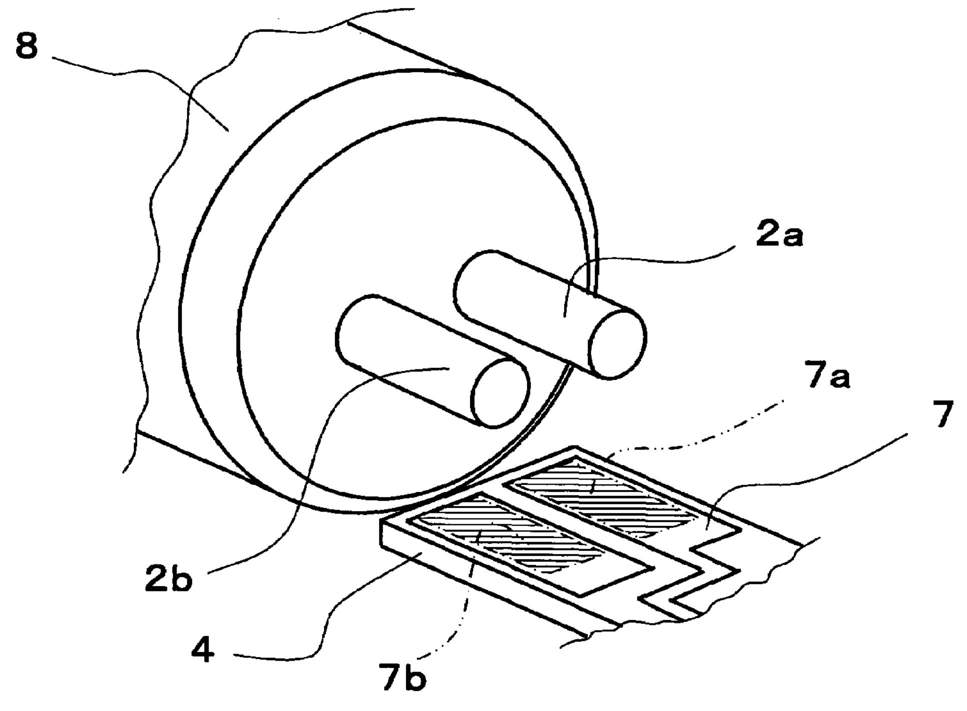

Next, an example of a method of fabricating the piezoelectric vibrator will be explained in reference to the drawings. FIG. 2 and FIG. 3 are outline perspective views for explaining a pallet for carrying the piezoelectric vibrator according to the embodiment, FIG. 4 is an outline enlarged perspective view of the airtight terminal held by a rectangular thin plate of the carrying pallet according to the embodiment, FIG. 5 is an outline total perspective view of the airtight terminal held by the carrying pallet according to the embodiment, FIG. 6 is an outline perspective view for explaining positioning of a piezoelectric vibrating piece aligning jig and the carrying pallet, FIGS. 7A and 7B are explanatory views of a step of bonding a lead terminal of the airtight terminal and the piezoelectric vibrating piece by plasma arc of the embodiment, FIG. 7A is a total outline constitution view, and FIG. 7B is a partial enlarged perspective view showing a bonding portion.

First, a detailed explanation will be given of the pallet for carrying the piezoelectric vibrator according to the embodiment constituting positioning means for positioning the inner lead 2 and the piezoelectric vibrating piece 4.

As shown by FIG. 2, a pallet 10 for carrying the piezoelectric vibrator according to the embodiment includes a plurality of cut portions 11 at one side of a long side of the carrying pallet 10 having a shape of a rectangular thin plate. As shown by FIG. 3, the cut portions 11 are aligned by paring at least two portions thereof. Further, a width A of the cut portion 11 is substantially equal to a diameter B of the outer lead 3, and an interval C of the pair of cut portions 11 is made to be larger than an outer diameter D of the airtight terminal 1.

The carrying pallet 10 is formed with a plurality of the cut portions 11 at one side of the carrying pallet 10 by using, for example, a dicer which is a general purpose precision working machine achieving a working accuracy of several μm, the outer lead 3 is pinched between the cut portions 11, and a shape of the pallet 10 and positions of the plural cut portions 11 and the outer lead 3 necessary for the step of the embodiment are made to be constituted with high accuracy.

As shown by FIG. 4, the outer lead 3 is pinched and held thereby by making the width of the plural cut portions 11 slightly smaller and press-fitting outer lead 3 thereinto, or making the width slightly larger and calking, adhesion or the like of the outer lead 3.

According to the example of the embodiment, an accuracy of the shape of the carrying pallet 10, an accuracy of the width of the cut portion 11, an accuracy of accumulated pitches of the cut portions 11 are constituted within 5 μm. The width A dimension of the cut portion 11 shown in FIG. 3 is constituted by 0.16 mm which is substantially equal to 0.18 mm of the diameter B of the outer lead 3. By constituting the interval C dimension of the pair of the cut portion 11 by 1.5 mm, the outer diameter D dimension of the airtight terminal 1 by 1.1 mm, an interval E of the inner leads 2 by 0.3 mm, making the interval C dimension of the pair of the cut portions 11 larger than the outer diameter D dimension of the airtight terminal 1 and 5 times as much as an interval E of the inner leads 2 of 0.3 mm, an accuracy of rotational angle of the inner lead 2 is restrained to ⅕ of a position of a rotational angle of the outer lead 3.

Thereby, positional accuracies of the outer lead 3 of the airtight terminal 1 and the inner lead 2 on the inner side of the airtight terminal 1 are ensured with high accuracy at inside of the carrying pallet 10 to a high accuracy level achieved by the working accuracy of the precision working machine.

A material of the carrying pallet 10 comprises a ceramic material, and electric insulation can be maintained between the plural cut portions 11 by maintaining the positional accuracies of the plural cut portions 11. Therefore, the carrying pallet 10 is preferable for making the inner leads 2 constituting an object of bonding according to the embodiment electrically independent from each other. Further, the carrying pallet 10 is preferable for achieving a predetermined frequency by applying a drive voltage to the piezoelectric vibrating piece 4 in a measuring step.

Further, as shown by FIG. 5, the carrying pallet 10 can carry to move 20 pieces of the held individual airtight terminals 1 easily in one motion summarizingly. The carrying pallet 10 is constituted by a simple shape of the rectangular thin plate and therefore, attachment and detachment thereof to and from a carrying apparatus of a conveyer or the like can easily be carried out, positioning thereof with the piezoelectric vibrating piece 4, mentioned later, can easily and stably be carried out, which is suitable for dealing with automation of the bonding stem according to the embodiment.

Next, as shown by FIG. 6, 20 pieces of the piezoelectric vibrating pieces 4 are aligned to an aligning jig 12 constituting means for aligning the piezoelectric vibrating pieces 4. By positioning the carrying pallet 10 ensured with the positional accuracy of the inner lead 2 of the airtight terminal 1 to the aligning jig 12 of the piezoelectric vibrating piece 4, positioning of the piezoelectric vibrating piece 4 and the inner lead 2 is carried out. Although according to the embodiment, the inner lead 2 is positioned to the piezoelectric vibrating piece 4, the piezoelectric vibrating piece 4 may be positioned to the inner lead 2 conversely thereto.

As shown by FIG. 7A, the inner lead 2 of the airtight terminal 1 held by the carrying pallet 10 is positioned as described above, and the inner lead 2 is brought into contact with the piezoelectric vibrating piece 4. One of a pair of output terminals for a power supply 16 for plasma arc (a terminal indicated by a bold line coming out from an upper side of the power supply 16 for plasma arc in the drawing) is connected to a plasma arc electrode 13. Other of the output terminals is connected to a side of the outer lead 3 of the lead terminal for generating plasma arc. The connection will be described later in details. A surrounding of the plasma arc electrode 13 is maintained in an atmosphere of argon gas 14, and the plasma arc electrode 13 is made to be proximate to a portion of bonding the inner lead 2 and the mount electrode 7 of the piezoelectric vibrating piece 4.

For generating a plasma arc 15, a voltage is applied between the plasma arc 13 and the outer lead 3 by the power supply 16 for the plasma arc and plasma arc discharge is generated between the inner lead 2 conducted to the outer lead 3 and the plasma arc electrode 13.

A metal wire of tungsten or a tungsten alloy is used for the plasma arc electrode 13. The tungsten alloy may include, for example, a lanthanum oxide, or may include yttrium oxide, a cerium oxide or the like. Further, the plasma arc electrode 13 may not necessarily be constituted by the metal wire but may be constituted by a metal electrode having a sharp front end in place of the metal wire.

Further, the bonding step will be explained in details in FIG. 7B. Although in FIG. 7B, the inner lead 2 and the mount electrode 7 are drawn separately from each other, this is for showing a constitution of combining the bonding portions conveniently. In an actually bonding case, as described above, an inner lead 2*a* of one of the pair of inner leads 2 is brought into contact with one amount electrode 7*a* of the pair of mount electrodes 7 and other inner lead 2*b* is brought into contact with other mount electrode 7*b* to respectively correspond to each other to be positioned thereby.

Plasma arc discharge is generated for respective one sides of two pieces of the inner leads 2. First, for example, when an object is constituted by the one inner lead 2*a*, a portion of the outer lead 3 corresponding to the inner lead 2*a* (not illustrated) is connected to the output terminal of the power supply 16 for plasma arc. Next, the plasma arc electrode 13, not illustrated, is made to be proximate to the inner lead 2*a*, and a predetermined voltage, mentioned later, is applied from the power supply 16 for plasma arc to between the plasma arc electrode 13 and the inner lead 2*a*. At the same time, the argon gas 14 is made to flow to a surrounding of vicinities of the plasma arc electrode 13 and the inner lead 2*a*. Discharge accompanied by a discharge heat is generated in an extremely short period of time between the electrode 13 for plasma arc and the inner lead 2*a*. By the discharge heat, water or the like adsorbed to a plating surface of the inner lead 2*a* and a surface of the mount electrode 7*a* of the piezoelectric vibrating piece 4 is instantaneously evaporated. Successively, solder plating 17 formed at the surface of the inner lead 2*a* is provided with a heat amount sufficient for breaking an oxide layer even when the oxide layer or the like is present on a surface thereof by being applied with the sufficient discharge heat. Therefore, the solder plating 17 is totally melted in a short period of time. That is, also a portion in which a temperature rise is deficient by constituting a shadow of the inner lead 2*a* in the hot wind method of the related art is sufficiently melted. Further, the solder plating 17 of the inner lead 2*a* flows to the mount electrode 7*a* the surface of which is formed by the thin layer of Au or the like to realize solid solder bonding. A surrounding of the bonding portion is present in the atmosphere of the argon gas 14 and therefore, the surrounding is constructed by a constitution of preventing a surface of bonding from being oxidized by blocking oxygen from the atmosphere.

At this occasion, the inner lead 2*b* contiguous and parallel therewith is brought into a floating potential since a portion of the outer lead 3 in correspondence therewith is not connected to the power supply 16 for plasma arc. Therefore, discharge is not generated between the inner lead 2*b* and the plasma arc electrode 13. Further, also the other mount electrode 7*b* arranged to be spaced apart therefrom by a distance of several tens μm at the piezoelectric vibrating piece 4 is brought into a floating state and therefore, discharge is not generated between the inner lead 2*b* and the plasma arc electrode 13. Furthermore, the stem 8 of the airtight terminal 1 and the pair of inner leads 2 are insulated from each other. In this way, all of conductive materials proximate to the inner lead 2*a* are maintained at a floating potential. Therefore, even when plasma arc discharge is generated, the discharge is generated by constituting an object by only the inner lead 2*a* connected to the power supply 16 for plasma arc. In this way, even in a constitution of arranging a conductive material spatially proximate thereto, an object of discharge can be specified and therefore, the object of supplying the heat amount can firmly be controlled.

After finishing bonding the inner lead 2*a* and the mount electrode 7*a*, a wiring connected to the portion of the outer lead 3 in correspondence with the inner lead 2*a* is disengaged to be switched to the portion of the outer lead 3 in correspondence with the other inner lead 2*b*. Thereafter, when operation is repeated to the inner lead 2*a* and the mount electrode 7*a*, mentioned above, the inner lead 2*b* and the mount electrode 7*b* can be connected. At this occasion, an influence of the later discharge is not effected to between the inner lead 2*a* and the mount electrode 7*a* bonded precedingly. That is, even when discharge accompanied by discharge heat is generated at a contiguous position, the influence of the discharge heat is extremely limited spatially.

Further, according to the wiring connected to the portion of the outer lead 3, the change of the wiring can easily be automated by using an electric switch mechanism of a relay or the like.

Successively, a description will be given of a control of the heat amount. In a case of a combination of the airtight terminal 1 (plating of which is carried out by the heat resistant solder plating) used in the embodiment and the power source 16 for plasma arc, it is preferable that a value of an arc current made to flow between the inner lead 2 and the plasma arc electrode 13 is a value in a range equal to or higher than 0.2 A (ampere) and equal to or lower than 1.0 A. That is, a heat amount necessary for melting the solder plating 17 without damaging the piezoelectric vibrating piece 4 and in a state of preventing a melted surface of the solder plating 17 from being oxidized can be supplied by the arc current value equal to or higher than 0.2 A and equal to or lower than 1.0 A.

When the arc current value is less than 0.2 A, the heat amount becomes deficient, the solder plating 17 is not melted sufficiently and excellent bonding cannot be achieved. Further, when exceeding 1.0 A, it is observed that a crystal structure of the piezoelectric vibrating piece 4 is changed, or the piezoelectric vibrating piece 4 is started to be cracked to be destructed. Further, in the middle range of the arc current value equal to or higher than 0.2 A and equal to or lower than 1.0 A, the solder plating 17 of the inner lead is sufficiently melted with excellent reproducibility and solid connection is achieved. Further, since the control range of the preferable current value is sufficiently wide, also in an actual mass production process, a step condition can stably be carried out with excellent reproducibility.

Describing further in details, a type of applying the arc current is preferably a waveform type in a pulse-like shape repeating electricity conduction and non-conduction. An applying system of the waveform type in the pulse-like shape repeating electricity conduction and non-conduction can promote solder wettability without damaging a processed surface to be bonded. When a current in the waveform of the pulse-like shape is used, there are a time period of a temperature rise by the plasma arc in conducting electricity and a cooling time period in non-conducting and therefore, there is provided a time period of conducting heat while restraining a rapid temperature rise of the processed surface to be bonded and therefore, a temperature of the bonding portion can gradually be elevated. For example, by setting an upper limit current value to 1 A, electricity conduction and non-conduction are repeated by constituting the electricity conducting time period by 0.5 ms and setting the non-conducting time period by 0.5 ms. Melting bonding is not achieved by 2 times of the repetition and crack is produced at the piezoelectric vibrating piece 4 in a case of exceeding 10 times thereof. Therefore, under a condition of setting the upper limit arc current value of 1 A, the electricity conducting time period of 0.5 ms, the non-conducting time period of 0.5 ms, a range of a number of times of electricity conduction from 3 times to 10 times is preferable.

Although the experimental conductions are described with regard to a case in which the solder plating 17 applied to the lead terminal and the stem 8 of the airtight terminal 1 is the heat resistant solder plating, the respective setting conditions of the arc current value range and the electricity conducting system can be applied by being pertinently adjusted in accordance with the heat capacity of the inner lead 2 of the airtight terminal 1 and the material of the solder plating 17. An explanation will be given to a case of lead free plating in which a material of the solder plating 17 is an SnCu alloy as an example.

In the case in which the material of the solder plating 17 is SnCu, the alloy is investigated as a potential candidate of lead free plating since lead is not included in a content thereof. When a content of copper is set to around 10% in order to promote heat resistance, in a phase diagram of a general SnCu alloy, a liquid phase line is elevated and it is extremely difficult to melt the plating. For example, when a concentration of Cu is 5%, a liquid phase line temperature is about 360° C., when the Cu concentration is 10%, the liquid phase line temperature becomes extremely as high as about 433° C. In contrast thereto, in a case of the heat resistant solder plating, a temperature of a liquid phase line is about 313° C. when Pb is 90% and is about 322° C. when Pb is 95%. Therefore, it is more difficult to melt plating of SnCu than the heat resistant solder plating. Furthermore, the Cu concentration in the solder plating of SuCu is varied by a maximum of about ±2% depending on production lots of plating and therefore, there is a concern that the melting temperature differs by about 50° C. through 60° C. for respective production lots.

In order to realize stable bonding by sufficiently melting the solder plating 17 under such a situation, it is necessary to pertinently select the arc current value and adopt the electricity conducting system.

Figure 8A:
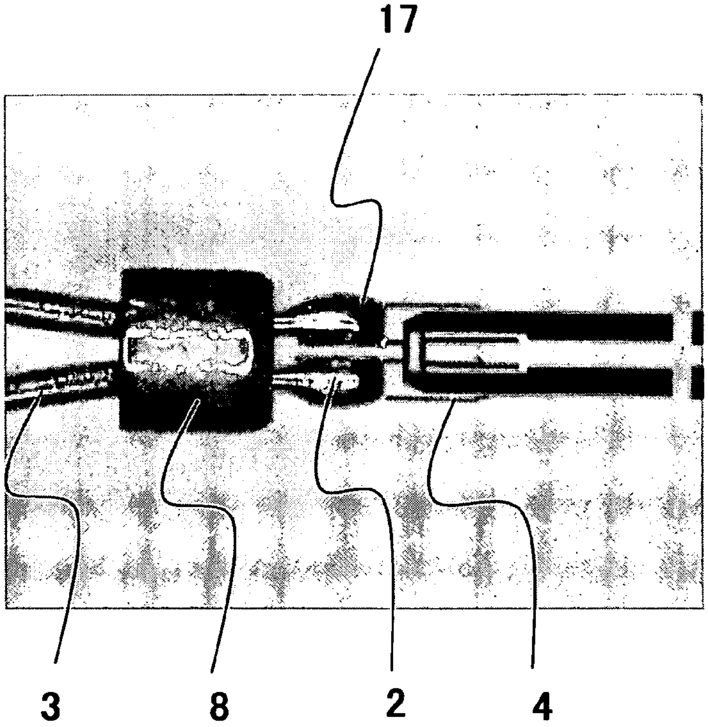
FIGS. 8A and 8B are photographs enlarged by a microscope to show states of bonding portions by comparing the portions with a difference in a bonding method.
Figure 8B:
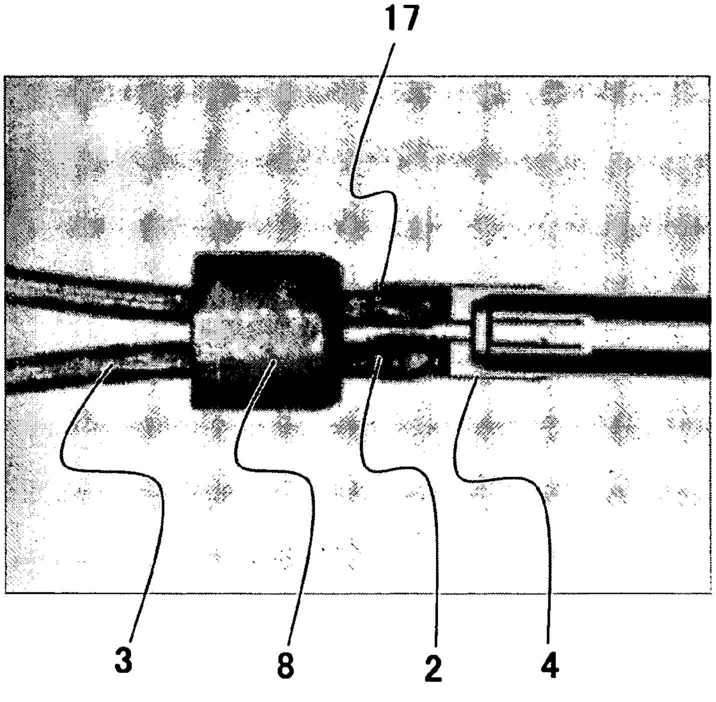

Now, an embodiment of the bonding process according to the invention is described in comparison with that of the related art. FIGS. 8A and 8B are photographs enlarged by a microscope to show a state of a bonding portions by comparing the portions with a difference in a bonding method. FIG. 8A is a photograph showing an example of a bonding state by a method of discharging plasma arc in argon gas, and FIG. 8B is a photograph showing an example of a bonding state by a hot wind system using nitrogen gas. Both in FIG. 8A and FIG. 8B, SnCu plating having a Cu concentration of 9% is used for the solder plating 17 of the inner lead 2 and the stem 8 of the airtight terminal. Further, in both cases, a dimension of the inner lead 2 after plating is 180 μm, the piezoelectric vibrating piece 4 is the tuning fork type quartz crystal vibrator, a width of a base portion is about 0.55 mm, a total length including the tuning fork arm is about 3.2 mm. The mount electrode 7 is a two-layer structure film applied with an Au layer by constituting a matrix by a Cr layer.

Although a temperature of a liquid phase line when a Cu concentration is 9% is about 421° C., as shown by FIG. 8A, when bonding is carried out by the method of discharging plasma arc in the argon gas, plating of a portion of the inner lead 2 is sufficiently melted, and well wetted to the mount electrode 7 and the solder plating 17 is widened over a total of the surface of the mount electrode 7. The solder plating 17 on the inner lead 2 is provided with a luster and a surface thereof is solidified without being oxidized in a melted state. Further, a heated portion is constituted only by the inner lead 2 and other portion of the stem 8 or the like is not effected with an influence of arc at all.

In contrast thereto, as shown by FIG. 8B, when bonding is carried out by the hot wind system of the related art, plating at the portion of the inner lead 2 is only slightly melted, an area thereof wetted to the mount electrode 7 is small and almost all the surface of the mount electrode 7 is seen as it is.

When the piezoelectric vibrators are respectively capped to the sealing tube 5 and a drop impact test is carried out after taking the photographs, although according to the piezoelectric oscillator having an excellent bonding state shown in FIG. 8A, a vibrating characteristic is not abnormal at all, the piezoelectric vibrator in which the bonding state is not excellent shown in FIG. 8B is not oscillated at all. When the piezoelectric vibrator which is not oscillated is disintegrated, the bonding portion of the inner lead 2 and the mount electrode 7 is exfoliated.

In this way, although according to the airtight terminal using the SuCu plating having the Cu concentration of 9% as a material of the solder plating 17, high quality bonding cannot be carried out by the method of bonding by the hot wind system, mentioned above, according to the method of bonding by discharging plasma arc in argon gas according to the invention, a sufficient bonding strength is achieved.

A material of the solder plating 17 is not limited to the SnCu plating but is applicable also to tin bismuth (SnBi) plating or tin silver (SnAg) plating. Particularly, in a case of SuAg plating, a liquid phase line is elevated by an increase in a concentration of Ag and therefore, similar to SnCu plating, melting is difficult in the related art. Also in this case, similar to SnCu plating, high quality bonding can be carried out by pertinently selecting an arc discharge condition.

Figure 9:
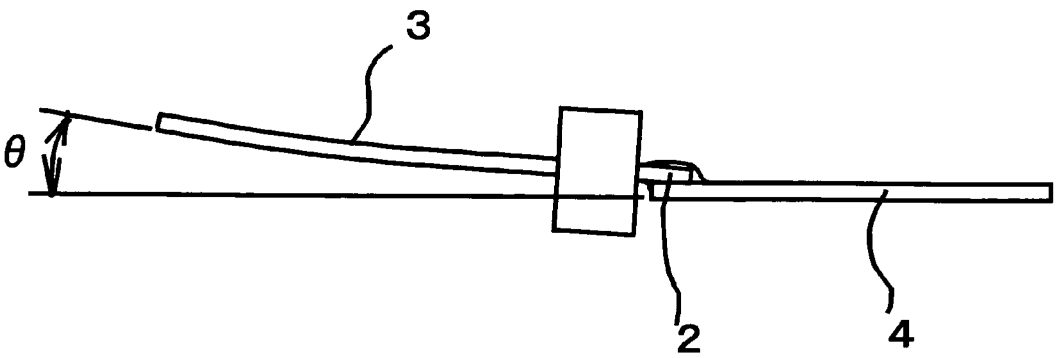
FIG. 9 is an outline explanatory view for explaining elastic force inclination bonding of the piezoelectric vibrating piece and an inner lead according to the embodiment.

FIG. 9 is an outline explanatory view for explaining an elastic force inclination bonding of the piezoelectric vibrating piece 4 and the inner lead 2 according to the embodiment. It is preferable to bring the inner lead 2 into contact with the piezoelectric vibrating piece 4 in a state of bending to incline the outer lead 3. By pressing the inner lead 2 to the piezoelectric vibrating piece 4 by an elastic force of the outer lead 3 produced by bending the outer lead 3, the inner lead 2 is not bent and the inner stress is alleviated. Further, a front end portion of the piezoelectric vibrating piece 4 is arranged at a center of the sealing tube 5 of the cylindrical bottomed cylinder member made of a metal. By arranging the front end portion of the piezoelectric vibrating piece 4 at the center of the sealing tube 5, the front end portion of the piezoelectric vibrating piece 4 can be prevented from being brought into contact with an inner wall of the sealing tube 5 with allowance.

By inclining an angle of the outer lead 3 designated by notation θ in the drawing by 1 degree or more and 4 degree or less, the inner lead 2 is disposed at the center portion of the sealing tube 5 of the cylindrical bottomed cylinder made of a metal, and the piezoelectric vibrator 6 can be fabricated without bringing the front end portion of the piezoelectric vibrating piece 4 into contact with the inner wall of the sealing tube 5. It can be prevented that oscillation becomes unstable and fine particles described above are produced at inside of the sealing tube 5 due to the touch.

As described above, according to the method of bonding the inner lead and the mount electrode according to the embodiment, in order to ensure various properties and the accuracy in the frequency and reliability of the piezoelectric vibrator, the piezoelectric vibrator and its fabricating method capable of achieving the positional accuracy of the bonding excellent in the solder wettability necessary for the piezoelectric vibrating piece and arranging the piezoelectric vibrating piece in correspondence with the small-sized piezoelectric vibrator can be provided.

Further, although in the above-described explanation, the gas used for discharging arc is constituted by a single element of argon, a deoxidizing gas can also be added to the argon gas.

Further, although the above-described explanation shows a case of melting the solder plating 17 formed on the surface of the inner lead 2 to be connected to the piezoelectric vibrating piece 4, the invention is not limited thereto but the solder plating 17 may be formed at the mount electrode 7 of the piezoelectric vibrating piece 4. That is, a piezoelectric vibrator achieving excellent bonding of the mount electrode 17 and the inner lead 2 by solder can be constituted by melting solder previously plated on at least either one of connecting faces of the mount electrode 7 and the inner lead 2. Further, instead of solder plating, a solder ball arranged on the mount electrode 7 is also applicable to plasma arc method.

Furthermore, although according to the bonding method, the mount electrode 7 is normally connected electrically to the exciting electrode 4*a* of the piezoelectric vibrating piece 4, the invention is not limited to the use but the invention may be for a use of mechanically connecting simply the lead terminal and the piezoelectric vibrating piece 4.

Furthermore, although according to the embodiment, an explanation has been given of the case in which there are 2 pieces of the mount electrodes and the airtight terminal includes 2 pieces of the leads, the invention is not limited thereto but the invention is similarly applicable to bonding in a case in which 3 pieces or more of the mount electrodes are arranged at the piezoelectric vibrating piece and in correspondence therewith, 3 pieces or more of the lead terminals are present at the airtight terminal.

Embodiment 2

Figure 10:
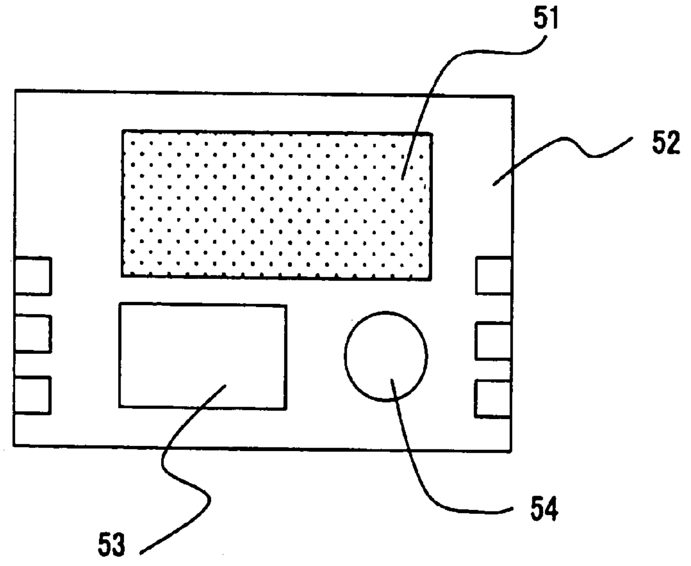
FIG. 10 is an outline schematic view showing a constitution of a tuning fork type quartz crystal vibrator according to a second embodiment of the invention.

FIG. 10 is an outline schematic view showing a constitution of a tuning fork type quartz crystal oscillator according to the invention, and is a plane view of a surface mount type piezoelectric oscillator utilizing a tuning fork type quartz crystal vibrator having an inner lead and a mount electrode bonded by the bonding method explained in embodiment 1.

In FIG. 10, a tuning fork type quartz crystal vibrator 51 is set to a predetermined position of a board 52, and an integrated circuit for an oscillator designated by notation 53 is installed contiguous to the quartz crystal vibrator. Further, also an electronic part 54 such as a capacitor is mounted. The respective parts are electrically connected by a wiring pattern, not illustrated. A mechanical vibration of a piezoelectric vibrating piece of the tuning fork type quartz crystal vibrator 51 is converted into an electric signal by a piezoelectric characteristic provided in quartz to be inputted to the integrated circuit 53. At inside of the integrated circuit 53, a signal processing is carried out to function as an oscillator for outputting a frequency signal. The respective constituent parts are molded by a resin, not illustrated. By pertinently selecting the integrated circuit 53, there is provided a function of controlling day or time of operating the apparatus or an outside apparatus for providing a user with time or calendar information other than that of a single function oscillator for a timepiece.

By using the piezoelectric vibrator fabricated by the fabricating method of the invention, even when the piezoelectric vibrating piece becomes small-sized, the vibrating piece is solidly connected to the airtight terminal, a change in a frequency is retrained against vibration or an external force of drop impact, and a failure of exfoliating the vibrating piece from the bonding face to stop oscillation or the like is minimized. Thereby, even when the oscillator is small-sized, stable oscillation can be maintained over a long period of time. Furthermore, the vibrator having a largest volume in the parts constituting the oscillator can be downsized stably with excellent yield and therefore, an outer shape dimension of the oscillator including vibrator can further be downsized.

Embodiment 3

Next, an explanation will be given of an example of an electronic apparatus using a piezoelectric vibrator fabricated by the fabricating method of the invention. A detailed explanation will be given here of a preferable embodiment of a portable information apparatus represented by a portable telephone.

First, as a premise, a portable information apparatus according to the embodiment is constituted by developing and modifying a wristwatch in the related art. The outlook is similar to that of a wristwatch, a liquid crystal display is arranged at a portion thereof in correspondence with a dial and current time or the like can be displayed on a screen thereof. When used as a communication apparatus, the apparatus is detached from the wrist, and communication similar to that of the portable telephone of the related art can be carried out by a speaker and a microphone included on an inner side of a strap portion. However, the apparatus is small-sized and light-weighted significantly in comparison with the portable telephone of the related art.

Figure 11:
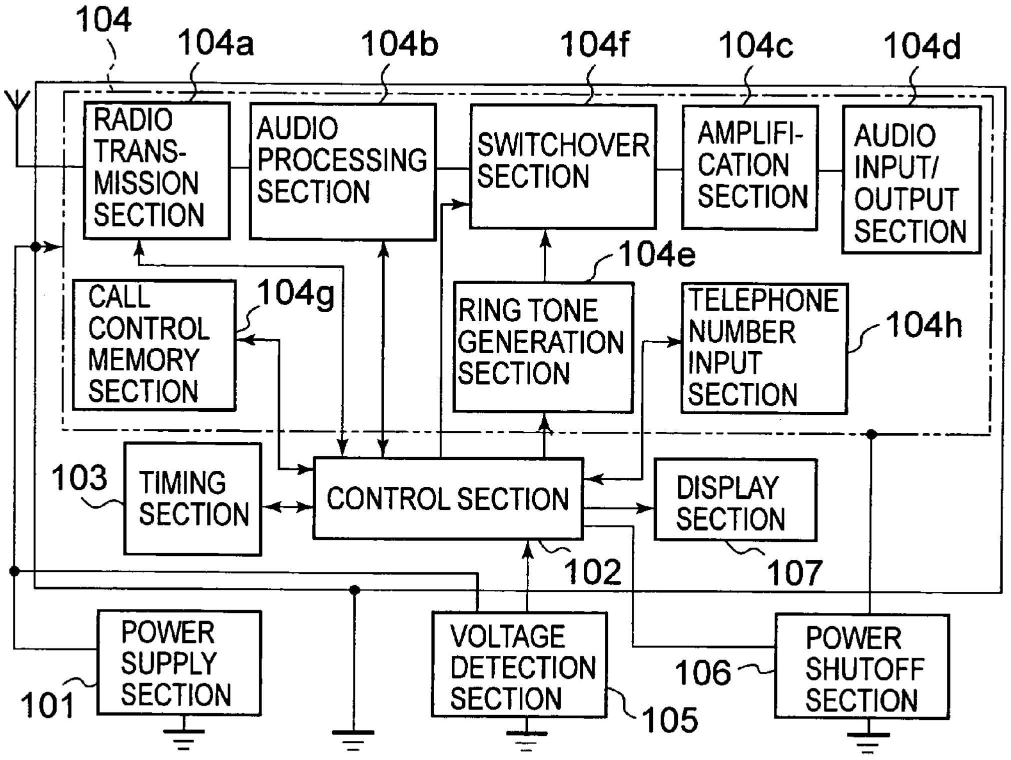
FIG. 11 is an outline view showing a block diagram of a portable information terminal apparatus according to a third embodiment of the invention.

Next, an explanation will be given of a functional constitution of the portable information apparatus according to the embodiment of the invention in reference to the drawings. FIG. 11 is a block diagram functionally showing the constitution of the portable information apparatus according to the embodiment.

In FIG. 11, notation 101 designates a power supply section for supplying power to respective functional sections, mentioned later, which is specifically realized by a lithium ion secondary cell. The power supply section 101 is connected in parallel with a control section 102, a timing section 103, a communication section 104, a voltage detection section 105 and a display section 107, mentioned later, and power is supplied from the power supply section 101 to the respective function sections.

The control section 102 controls operation of a total of the system such as transmission and reception of audio data, measurement and display of current time or the like by controlling the respective function sections, mentioned later. The control section 102 is realized specifically by a program previously written to ROM, CPU reading and executing the program, and RAM or the like used as a work area of the CPU.

The timing section 103 is constituted by an integrated circuit including an oscillating circuit, a register circuit, a counter circuit, an interface circuit or the like and the tuning fork type quartz crystal vibrator shown in FIG. 1. A mechanical vibration of the tuning fork type quartz crystal vibrator is converted into an electric signal by a piezoelectric characteristic provided in quartz and is inputted to the oscillating circuit formed by a transistor and a capacitor. An output of the oscillating circuit is binarlized and is counted by the register circuit and the counter circuit. Transmission and reception of a signal is carried out with the control section by way of the interface circuit, and current time or current date or calendar information is displayed on the display section 107.

The communication section 104 is provided with a function similar to that of the portable telephone of the related art, and is constituted by a radio transmission section 104*a*, an audio processing section 104*b*, an amplification section 104*c*, an audio input/output section 104*d*, a ring tone generation section 104*e*, a switchover section 104*f*, a call control memory section 104*g* and a telephone number input section 104*h*.

The radio transmission section 104*a* transmits and receives various data of audio data or the like to and from a base station by way of an antenna. The audio processing section 104*b* codes/decodes an audio signal inputted from the radio transmission section 104*a* or the amplification section 104*c*, mentioned later. The amplification section 104*c* amplifies a signal inputted from the audio processing section 104*b* or the audio input/output section 104*d*, mentioned later, to a predetermined level. The audio input/output section 104*d* is specifically a speaker and a microphone for making ring tone or received voice loud, or collecting speaker voice.

Further, the ring tone generation section 104*e* generates ring tone in accordance with call from the base station. The switchover section 104*f* outputs generated ring tone to the audio input/output section 104*d* by way of the amplification section 104*c* by switching over the amplification section 104*c* connected to the audio processing section 104*b* to the ring tone generation section 104*e* only when the signal is received.

Further, the call control memory section 104*g* stores a program related to a control of transmitting and receiving call of communication. Further, the telephone number input portion 104*h* is specifically constituted by number keys from 0 to 9 and other keys for inputting a telephone number or the like of a counter party.

When a voltage applied to the respective function sections starting from the control section 102 by the power supply portion 101 becomes lower than a predetermined value, the voltage detection section 105 detects the voltage drop to inform to the control section 102. The predetermined voltage value is a value which is previously set as a minimum voltage necessary for stably operating the communication section 104 and is, for example, a voltage of about 3 V. The control section 102 which is informed with the voltage drop from the voltage detection section 105 prohibits operation of the radio transmission section 104*a*, the audio processing section 104*b*, the switchover section 104*f*, and the ring tone generation section 104*e*. Particularly, it is indispensable to stop operating the radio transmission section 104*a* having large power consumption. Simultaneously therewith, the display portion 107 is displayed with that the communication section 104 cannot be used by a deficiency in a remaining amount of the cell.

It is possible to prohibit operation of the communication section 104 by operation of the voltage detection section 105 and the control section 102 and display the prohibition on the display portion 107.

According to the embodiment, by providing the power shutoff section 106 capable of selectively shutting off power supply of a portion related to the function of the communication section, the function of the communication section can be stopped in a further complete style.

Further, although the display that the communication portion 104 cannot be used may be carried out by a character message, the display may be carried out by a method of attaching x mark (failure) at a telephone icon on the display portion 107 further intuitively.

By using the small-sized piezoelectric vibrator fabricated by the fabricating method of the invention in the portable information apparatus, the portable electronic apparatus can further be downsized. According to the vibrator, even when the vibrating piece is downsized, since bonding with the airtight terminal is carried out solidly, a resistance against vibration or external force of drop impact or the like is promoted and a stable vibration can be continued over a long period of time. Therefore, the portable electronic apparatus including the vibrator can be maintained stably over a long period of time.

Embodiment 4

Next, an explanation will be given to a radio time piece 200 electrically connecting the quartz crystal vibrator described in the embodiments to a filter section as a fourth embodiment of the invention in reference to FIG. 12.

Figure 12:
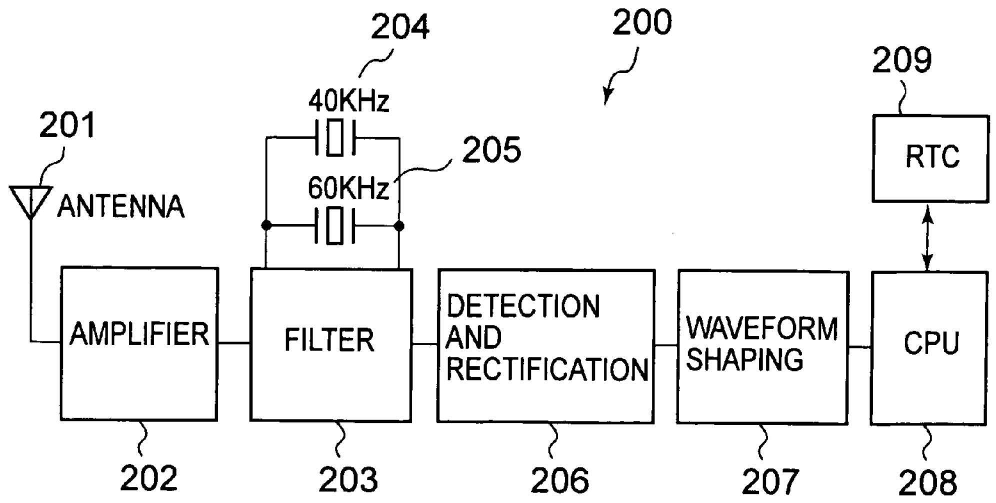
FIG. 12 is a block diagram of a radio wave timepiece according to a fourth embodiment of the invention.
Figure 13:
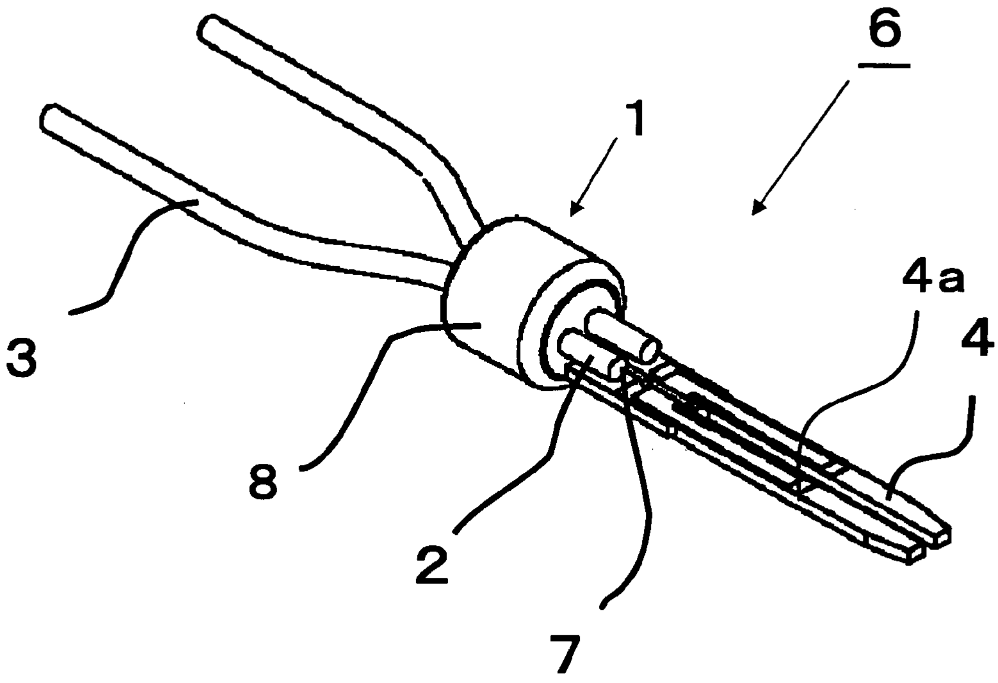
FIG. 13 is an outline perspective view for explaining a piezoelectric vibrator.
Figure 14:
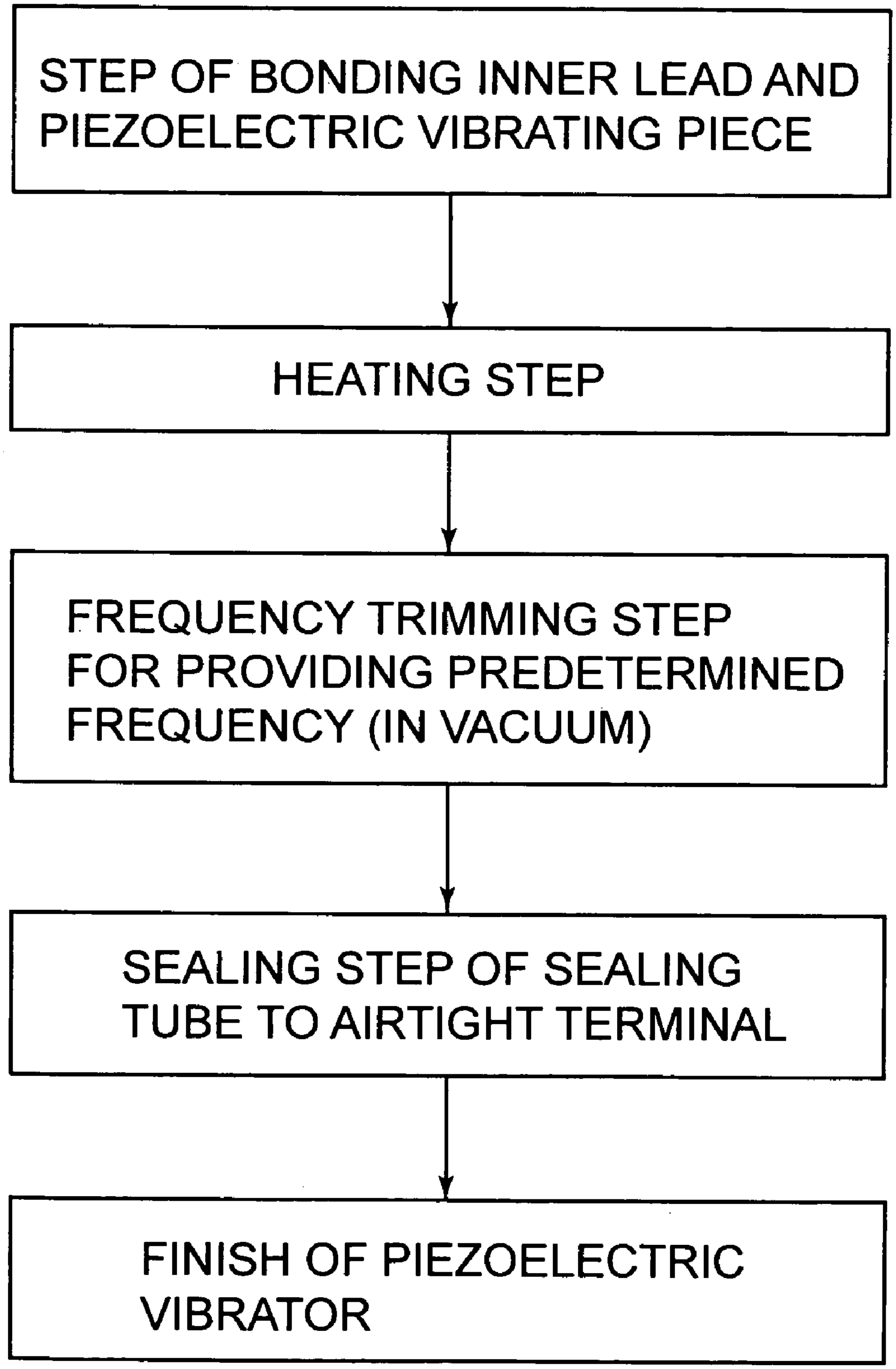
FIG. 14 is a flowchart simply showing steps of fabricating the piezoelectric vibrator of FIG. 13.
Figure 15:
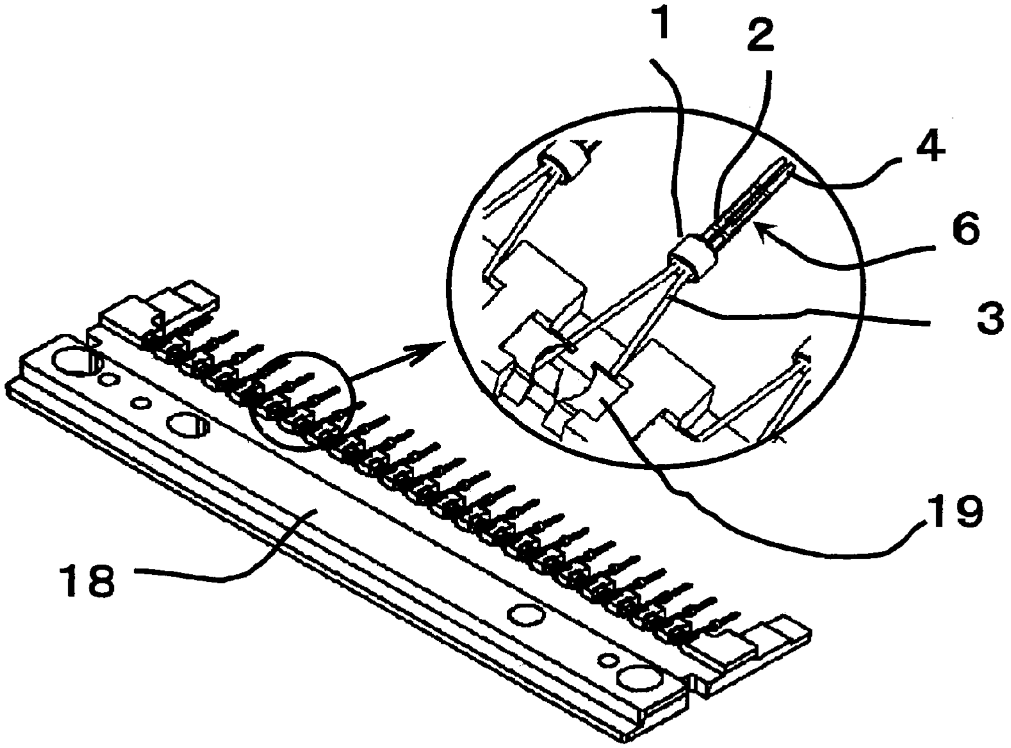
PRIOR ART FIG. 15
FIG. 15 is an outline perspective view of a pallet for carrying a piezoelectric vibrator of a background art.

FIG. 12 is a block diagram showing a functional constitution of a radio timepiece 200.

The radio timepiece 200 is a timepiece having a function of receiving a standard radio wave including time information and automatically correcting time of the timepiece to accurate time. In Japan, there are transmitting locations (transmitting stations) for transmitting the standard radio wave at Fukushima prefecture (40 KHz) and saga prefecture (60 KHz) for respectively transmitting the standard radio wave. A long wave such as 40 KHz or 60 KHz is provided with both of a property of propagating on a ground surface and a property of propagating while being reflected by the ground surface and the ionized layer and therefore, a range of propagation is wide and covers all of Japan by the two transmitting locations.

A functional constitution of the radio wave timepiece 200 will be explained in reference to FIG. 12.

An antenna 201 receives the standard radio wave of the long wave of 40 KHz or 60 KHz. The standard radio wave of the long wave is constituted by subjecting a carrier wave of 40 KHz or 60 KHz of time information referred to as time code to AM modulation.

The received standard radio wave of the long wave is amplified by an amplifier 202, and filtered and tuned by a filter circuit (filter portion) 203 having a quartz crystal vibrator. The quartz crystal vibrator according to the embodiment includes quartz crystal vibrator portions 204, 205 having oscillation frequencies of 40 KHz and 60 KHz the same as the carrier frequencies.

Further, the filtered signal of the predetermined frequency is detected and decoded by the detection and rectification circuit 206. Successively, the time code is outputted by way of the waveform shaping circuit 207, and is counted by CPU 208. CPU 208 reads current year, calculated date, day of week, time and the like. Read information is reflected to RTC (Real Time Clock) 209 and accurate time information is displayed.

The carrier wave is constituted by 40 KHz or 60 KHz and therefore, the vibrator having the structure of the tuning fork type, mentioned above, is preferable for the quartz crystal vibrator portion 204, 205. Taking an example of 60 KHz, as an example of dimensions of the tuning fork type vibrating piece, it is possible to constitute the tuning fork type vibrating piece by dimensions of a total length of about 2.8 mm, a width dimension of the base portion of about 0.5 mm.

Although the above-described explanation is shown by the example in Japan, the frequency of the standard radio wave of the long wave differs abroad. For example, in Germany, a standard radio wave of 77.5 KHz is used. Therefore, when a radio wave timepiece capable of being dealt with also abroad is built in a portable apparatus, a quartz crystal vibrator having a frequency different from that in the case of Japan is needed.

By using the small-sized piezoelectric vibrator fabricated by the fabricating method of the invention in a radio wave timepiece, the radio wave timepiece is provided with an excellent resistance against vibration or external force of drop impact or the like and the accuracy can be maintained stably over a long period of time.

What is claimed is:

1. A method of fabricating a piezoelectric vibrator comprising:

providing an airtight terminal comprised of a lead terminal and a piezoelectric member, the lead terminal having an inner lead portion and an outer lead portion, and the piezoelectric member having an exciting electrode and a mount electrode disposed on a surface of the piezoelectric member;

providing a power supply and a plasma arc electrode connected to the power supply for generating a plasma arc discharge;

connecting the outer lead portion of the lead terminal to an output terminal of the power supply and positioning the plasma arc electrode at a vicinity of a bonding portion for bonding together the inner lead portion of the lead terminal and the mount electrode of the piezoelectric member;

applying a voltage between the inner lead portion of the lead terminal and the plasma arc electrode to generate a plasma arc discharge; and discharging the generated plasma arc to the bonding portion while subjecting at least the bonding portion to an argon gas atmosphere to thereby bond together with a solder the inner lead portion of the lead terminal and the mount electrode of the piezoelectric member.

2. A method according to claim 1; further comprising, prior to bonding together the inner lead portion of the lead terminal and the mount electrode of the piezoelectric member, the steps of supporting the outer lead portion of the lead terminal within a cut portion of a positioning device to position the outer lead portion, and aligning the inner lead portion relative to the mount electrode using an alignment device.

3. A method according to claim 1; wherein the inner lead portion and the mount electrode are bonded while pressing the inner lead portion to the mount electrode utilizing an elastic force of the outer lead portion of the lead terminal.

4. A method of fabricating a piezoelectric vibrator, comprising:

providing an airtight terminal comprised of a lead terminal and a piezoelectric member, the lead terminal having an inner lead portion and an outer lead portion, and the piezoelectric member having an exciting electrode and a mount electrode disposed on a surface of the piezoelectric member;

supporting the outer lead portion of the lead terminal within a cut portion of a positioning device to position the outer lead portion;

aligning the inner lead portion of the lead terminal relative to the mount electrode of the piezoelectric member using an alignment device; and discharging a plasma arc to a bonding portion for bonding together the inner lead portion of the lead terminal and the mount electrode of the piezoelectric member while subjecting at least the bonding portion to an argon gas atmosphere to thereby bond together with a solder the inner lead portion and the mount electrode.

5. A method according to claim 4; wherein the inner lead portion and the mount electrode are bonded while pressing the inner lead portion to the mount electrode utilizing an elastic force of the outer lead portion of the lead terminal.

6. A method of fabricating a piezoelectric vibrator, comprising:

providing an airtight terminal comprised of a lead terminal and a piezoelectric member, the lead terminal having an inner lead portion and an outer lead portion, and the piezoelectric member having an exciting electrode and a mount electrode disposed on a surface of the piezoelectric member; and discharging a plasma arc to a bonding portion for bonding together the inner lead portion of the lead terminal and the mount electrode of the piezoelectric member while subjecting at least the bonding portion to an argon gas atmosphere and while pressing the inner lead portion to the mount electrode utilizing an elastic force of the outer lead portion of the lead terminal to thereby bond together with a solder the inner lead portion and the mount electrode.

* * * * *

UNITED STATES PATENT AND TRADEMARK OFFICE

CERTIFICATE OF CORRECTION

PATENT NO. : 7,581,297 B2
APPLICATION NO. : 11/409653
DATED : September 1, 2009
INVENTOR(S) : Sato et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 412 days.

Signed and Sealed this

Fourteenth Day of December, 2010

David J. Kappos

*Director of the United States Patent and Trademark Office*